US012762878B2

(12) United States Patent
Bertrand

(10) Patent No.: US 12,762,878 B2
(45) Date of Patent: Oct. 13, 2026

(54) METHOD, SYSTEM AND DEVICE FOR ANALYZING PLACEMENT OF DIGITAL ASSETS IN A USER INTERFACE

(71) Applicant: Lucas Bertrand, London (GB)

(72) Inventor: Lucas Bertrand, London (GB)

( * ) Notice: Subject to any disclaimer, the term of this patent is extended or adjusted under 35 U.S.C. 154(b) by 358 days.

(21) Appl. No.: 18/620,495

(22) Filed: Mar. 28, 2024

(65) Prior Publication Data

US 2024/0331427 A1 Oct. 3, 2024

(30) Foreign Application Priority Data

Mar. 31, 2023 (GB) ...................................... 2304888

(51) Int. Cl.
*G06V 30/30* (2022.01)
*G06T 7/70* (2017.01)
*G06V 30/19* (2022.01)

(52) U.S. Cl.
CPC ................ *G06V 30/30* (2022.01); *G06T 7/70* (2017.01); *G06V 30/19013* (2022.01); *G06V 30/191* (2022.01); *G06T 2200/24* (2013.01); *G06V 2201/02* (2022.01); *G06V 2201/09* (2022.01)

(58) Field of Classification Search
CPC ............. G06V 30/30; G06V 30/19013; G06V 30/191; G06V 2201/02; G06V 2201/09; G06V 30/10; G06V 30/414; G06T 7/70; G06T 2200/24; G06F 9/451
See application file for complete search history.

(56) References Cited

U.S. PATENT DOCUMENTS 9,762,651 B1 * 9/2017 Sharifi .................. G06F 16/583
12,423,969 B2 * 9/2025 Dela Rosa ........... G06V 10/764
2006/0221417 A1 10/2006 Fujieda et al.
2014/0177964 A1 * 6/2014 Godlewski ......... H04N 21/2343 382/190
2017/0132742 A1 * 5/2017 Deluca ................. G06V 30/142
2017/0243228 A1 * 8/2017 Wang ...................... G06F 11/34
2019/0147220 A1 5/2019 Mccormac et al.
2023/0132156 A1 * 4/2023 Chanchlani ............ H04N 23/74 348/78
2023/0169155 A1 * 6/2023 Vuppala ............. H04N 1/00843 348/207.11
2023/0206631 A1 * 6/2023 Olechowski, III ..... G06V 20/41 382/103
2026/0034437 A1 * 2/2026 Cerrato ................... A63F 13/22

FOREIGN PATENT DOCUMENTS

CN 106373158 2/2017
CN 115546465 12/2022
JP 2017-168029 9/2017

OTHER PUBLICATIONS

Search Report under Section 17(5) GB Application No. GB2304888.7, mailed Oct. 24, 2023, 3 Pages.
Office Action issued in United Kingdom Application No. GB2304888.7 dated Aug. 17, 2026, 6 pages.

* cited by examiner

*Primary Examiner* — John B Strege
(74) *Attorney, Agent, or Firm* — DLA Piper LLP (US)

(57) ABSTRACT

A method, carried out by one or more processors, for analysing the placement in a user interface, by an electronic device, of digital assets, the method comprising scanning image data of a user interface of an electronic device, capturing image data of an instance of the user interface of the electronic device, identifying a parameter of one or more digital assets in the captured image data.

18 Claims, 5 Drawing Sheets

10

METHOD, SYSTEM AND DEVICE FOR ANALYZING PLACEMENT OF DIGITAL ASSETS IN A USER INTERFACE

CROSS-REFERENCE TO RELATED APPLICATION

This application claims priority to GB Application No. 2304888.7, filed Mar. 31, 2023, which is incorporated by reference in its entirety.

TECHNICAL FIELD

This disclosure relates to analysing the placement of digital assets in a user interface. It is particularly relevant to, but not limited to, analysing the user interface of a content distribution system.

BACKGROUND

Media content distribution applications and services (e.g. video-on-demand services) are increasingly utilised for the consumption of media content on connected devices (e.g. smart TVs). The placement of a content item or application icon relating to a digital asset of a content/service provider is important for the exposure of the content. For example, a content item in a prime location can ensure that a higher engagement of users with the content is achieved. However, there is a need for a system and method of determining the location of the placement of content items and application icons as provided on different user interfaces across different platforms. This is to ensure that content/service providers and distributors have adequate knowledge regarding the placement of their assets on a particular platform. There is also a need for a system and method of ensuring that content owners have the means to determine whether the correct artwork, price and publication window is being provided for the content item. These methods also enable the tracking of changes in the placement and form of the content items and application icons so that content providers, service providers, and content distributors can be notified of a change to the display location and form of their digital assets.

At present, a content/service provider is required to conduct extensive independent data collection in order to gain insight into the placement of digital assets as displayed on a particular platform and their compliance with agreed terms of placement. Typically, this may require cooperation from consumers of the content or service and may be impractical.

For example, there exists a system in which a crowd sourcing approach is utilised by requesting that users themselves navigate the display on their own screens and take their own images of the user interface that is being shown to them. The users then send the data to a central processing centre where it can be analysed.

However, the crowd sourcing approach does not scale to facilitate the scan and capture of the entire offering of a particular provider. In particular, it is impractical and time consuming for single users to record the position of items manually in this way. Another drawback of the crowd sourcing approach is that the quality of the image of a screen captured by a user may be compromised meaning that the analysis of such an image may not provide the necessary insight. In this event, it is further time consuming to have to repeat the process in order to improve the quality and obtain a successful analysis.

Another approach is to parse the HTML of the user interfaces.

The HTML parsing approach requires access to the published HTML which is available only at a web browser accessed by a computing device. However, other devices, such as the electronic device, do not have granted access to the HTML. That is, when it is not possible to access the published HTML directly from the electronic device, it is not possible to implement a HTML parsing approach.

Therefore, there exists a need for a method of accessing information about the placement of content items and application icons on user interfaces without requiring the involvement of the user or the manual acquisition of imagery of the display of such user interfaces by users themselves. Further, there exists a need for a method and system which provides an approach to mapping a user interface and analysing the placement of digital assets on the user interface of an electronic device, without requiring access to the published HTML by the electronic device.

In the present disclosure, a method and system are provided which enable the determination of the placement of digital assets on a user interface of an electronic device at improved convenience, efficiency and scalability. The method and system also enable reliable and scalable execution of compliance workflows to check the compliance of the form and timing of the placement of digital assets compared with agreed terms of placement.

SUMMARY

In a first aspect, there is provided a method, carried out by one or more processors, for analysing the placement in a user interface, by an electronic device, of digital assets, the method comprising: scanning image data of a user interface of an electronic device; capturing image data of an instance of the user interface of the electronic device; identifying a parameter of one or more digital assets in the captured image data.

Identifying a parameter of one or more digital assets in the captured image data may comprise analysing the captured image data to: identify a selected digital asset in the captured image data; and/or determine position information of one or more digital assets in the captured image data.

The method may comprise: in response to identifying a selected digital asset in the captured image data, capturing further image data of a resultant instance of the user interface of the electronic device; and identifying another parameter of the one or more digital assets in the further captured image data.

The method may comprise: in response to identifying a selected digital asset in the captured image data, determining position information of one or more digital assets in the captured image data.

Identifying another parameter of the one or more digital assets in the further captured image data may comprise analysing the further captured image data to: identify a further selected digital asset in the further captured image data; or determine position information of one or more digital assets in the further captured image data.

The position information may include at least one of a page, a row, a column, or a spot at which the digital asset is disposed in the image data.

The method may comprise, for a plurality of users, obtaining, from a third party service, user data indicating performance data for user interactions with the digital asset on the third party service. The method may comprise: combining the user data for each of the plurality of users with the position information for the digital asset; generating a value curve to indicate performance data is affected by the position of the digital asset on the user interface; applying the value curve to the user interface to generate a model of the user interface indicating the relative value of positions on the user interface.

The scanning and capturing operations may be carried out by a first processor and the identifying operation of may be carried out by a second processor.

The first processor and the second processor may be located on a scanning device.

The first processor may be located on a scanning device and the second processor may be located at one or more servers in communication with the scanning device via a communication network.

The captured image data may be provided, by the first processor on the scanning device, via the communication network, to the second processor on the one or more servers.

Identifying a parameter of the one or more digital assets in the captured image data may comprise: in response to the captured image data being received at the second processor, processing the captured image data to identify text and/or image features of the one or more digital assets in the captured image data. Processing the captured image data may comprise using optical character recognition to identify text in the captured image data. The text may include a title of the digital asset.

The method may comprise: comparing the identified text and/or image features of a digital asset in the captured image data with text and/or image features of one or more stored digital assets in a database at the one or more servers to identify said digital asset.

The image features may comprise one or more of a logo of an application, a design of an application icon, a design indicating a particular content item, a symbol indicating a particular navigation option of a user interface.

The scanning device may be deployed remotely from the electronic device.

Processing, by the one or more servers, the captured image data may comprise using artificial intelligence to identify the image features of the one or more digital assets. The artificial intelligence may be configured to identify image features based on variations of said image features.

The scanning device may be a first scanning device, the electronic device may be a first electronic device, the image data may be first image data, the one or more digital assets may be one or more first digital assets, and the position information may be first position information, and the method may comprise: capturing, by a second scanning device in communication with a second electronic device different to the first electronic device, second image data at the second electronic device; providing, to the one or more servers via the communication network, the captured second image data; identifying one or more second digital assets in the captured second image data; and for one or more second digital assets in the captured second image data: determining second position information indicating the placement of an identified second digital asset in the captured second image data; and comparing the second position information indicating the placement of an identified second digital asset in the captured second image data with the first position information indicating the placement of the same identified digital asset among the one or more first digital assets in the captured first image data; and indicating differences in the position information indicating the placement of each identified digital asset.

The one or more digital assets may comprise an application icon or a content item of a user interface. The one or more digital assets may comprise a navigation option of a user interface.

The electronic device may comprise a set-top box, a television, a smart television, a mobile device, a computing device or a tablet computing device.

The image data may comprise an image or an encoded signal.

The method may comprise determining that the image or the encoded signal is static before capturing the image data.

The method may comprise encoding the image data with a timestamp representing the time of capturing the image data.

Capturing image data may comprise encoding the captured image data with a geographical location of the electronic device being scanned to capture the image data.

In a second aspect, there is provided a system comprising: one or more servers in communication, via a communication network, with one or more scanning devices, the one or more servers comprising: a first computer-readable medium storing first instructions; and first processing hardware coupled to the first computer-readable medium, the first processing hardware configured to implement the first instructions; and the one or more scanning devices comprising: a second computer-readable medium storing second instructions; and second processing hardware coupled to the second computer-readable medium, the second processing hardware configured to implement the second instructions. The first and second processing hardware are configured to implement the first and second instructions, respectively, to carry out a method of the first aspect.

In a third aspect, there is provided a scanning device comprising: a processing system configured to: scan image data of a user interface of an electronic device in communication with the scanning device; capture image data of an instance of the user interface of the electronic device; provide, via the communication network, the captured image data to one or more servers in communication with the scanning device.

BRIEF DESCRIPTION OF THE DRAWINGS

Specific implementations of the present disclosure are described below in the detailed description by way of example only and with reference to the accompanying drawings, in which.

Like reference numerals are used for like components throughout the drawings.

DETAILED DESCRIPTION

In overview, and without limitation, the application discloses a method, carried out by one or more processors, for analysing the placement in a user interface, by an electronic device, of digital assets, the method comprising: scanning image data of a user interface of an electronic device; capturing image data of an instance of the user interface of the electronic device; identifying a parameter of one or more digital assets in the captured image data. The application also discloses a system and a device configured to carry out operations of the method.

Accordingly, the present disclosure enables: the collection and processing of user interface data to improve the viewing of digital assets on electronic devices; the gathering of real time data on the user interface (UI) of 1,000's of platforms at once; recognition of on-screen position of a remote UI and the ability to chart a path from an existing selection to a desired one; recognition of UI errors, key mis-presses and Devices Under Test (DUT) bugs that prevent predictable interactions and the facility to recover from them; using both images and OCR text to automatically recognise digital assets and correlate them with assets in other territories and other stores.

The present disclosure also enables the facility to use AI to compare asset images between different screen formats to identify asset. Often, images will have minor differences based on differences in format or storefront processing meaning that a conventional image comparison approach does not work.

The present disclosure also enables: the facility to process data and provide real-time algorithmic generated insights highlighting placement and value changes; the facility to use the data to assess the value of the placement of an individual asset; the facility to scan a large range of media devices without having to place any custom code on the device; the facility to remotely manage the device such that it can be placed on a specific network if necessary; the facility to remotely manage the devices such that they scan many different territories from a single location; the facility to find instances of the same asset in different stores and territories using image comparison; the facility to assign a weighting value to how effective a given spot placement is meaning that it is possible to assess which studios and application providers have the best share of the subscribers attention.

The present disclosure also enables the facility to recognise when a content provider makes a marketing initiative in an automated way. For instance, using the presently disclosed method, it can be detected if a provider takes over a whole row or launches an asset where an unusual number of spots in the store front are used.

These and other advantages will be apparent from the following description of the subject matter disclosed herein.

Figure 1:
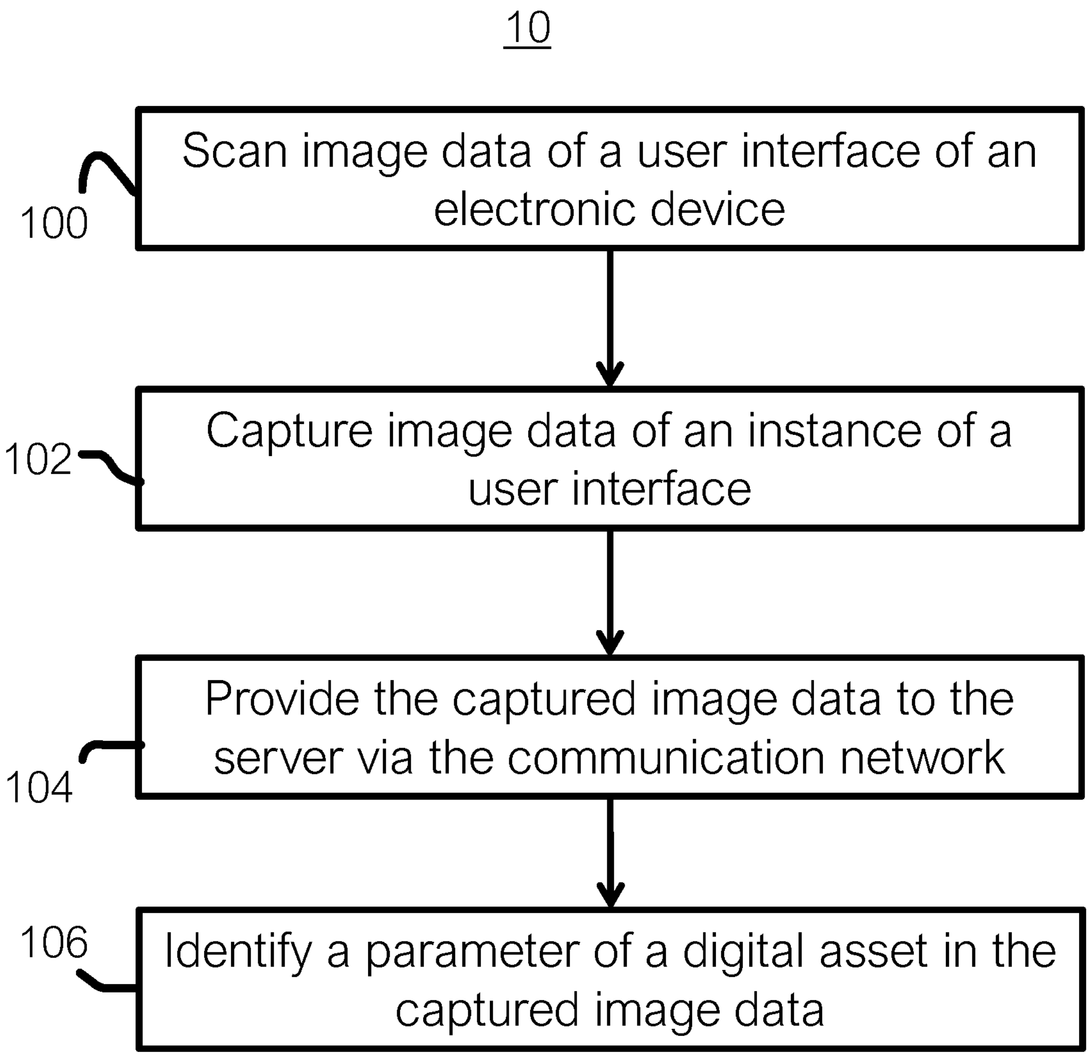
FIG. 1 is a flowchart showing a method of analysing the placement of digital assets on an electronic device.

Referring to FIG. 1, a flowchart of a method 10 of determining the placement of content items and application icons relating to digital assets by an electronic device is shown, according to some implementations.

In operation 100, a scanning device scans image data of a user interface of an electronic device in communication with the scanning device. The electronic device may be a set-top box (STB), television, smart television, mobile device, a computing device, a tablet computing device, or the like. The electronic device may be any device which provides a user with access to content via an application or service distributed by a content distributor. In this way, the electronic device may be a connected device or a device which provides access to content which is distributed by the connected device for consumption by a user.

In some implementations, the scanning device is provided physically next to the electronic device such that the geographic location of the electronic device is known to the deployer of the scanning device. In such examples, the geographic location of the electronic device is included as contextual information encoded in image data captured by the scanning device, as described below.

In operation 102, the scanning device captures image data of an instance of the user interface of the electronic device. The image data may include an encoded signal output by the electronic device for the display of an image on a screen of the electronic device or a display screen in communication with the electronic device. Therefore, the scanning device may not require the electronic device to output an image on a screen in order for the image data to be captured.

In some implementations, the scanning device captures image data of the entire displayed user interface. In other implementations, the scanning device captures image data of a portion of the user interface less than the entire user interface or captures image data of a specific spot on the user interface.

In some implementations, the instance of the user interface is a menu of the user interface. The menu screen may include digital assets such as content items or application icons selectable by a user of the electronic device. Content items may include, for example, video content such as film or television content, gaming content, and the like, and may include images advertising or describing the content of the digital assets to the user. Application icons may include icons for video-on-demand services, streaming services, IPTV services, gaming services, or the like, and may include images advertising or describing applications to the user. Hereinafter, content items, application icons and the like will be referred to in general as assets unless particular examples relate to one such type of item or icon more specifically.

In some implementations, the instance of the user interface also includes one or more navigation icons facilitating the user to explore options within a menu graphic of the user interface.

In some implementations, capturing the image data includes encoding the image data with a timestamp indicating the time of capturing the image data. In some implementations, capturing the image data includes encoding the image data with the geographic location of the electronic device being scanned. In some implementations, capturing the image data includes encoding the image data with both the timestamp of the time of capturing the image data and includes the geographic location of the electronic device being scanned.

In operation 104, the scanning device provides the captured image data to one or more servers via a communication network. For example, the scanning device may be in communication with the one or more servers via a Local Area Network (LAN), an intranet, an extranet, the Internet, or any other suitable communication network means.

In operation 106, the one or more servers identify a parameter of one or more digital assets in the captured image data. That is, once the one or more servers have received the captured image data from the scanning device, the one or more servers may process the captured image data to perform an identification of a parameter of a digital asset in the captured image data.

In some implementations, processing the captured image data to identify a parameter of an asset in the captured image data includes identifying image or text features of the asset in the captured image data. The image or text features of the asset can be used to identify what the asset relates to. That is, the parameter may indicate content to which the asset relates, or an application or service to which the asset relates. In some further examples, assets may be identified which indicate an operation, such as a navigation operation. Selection of such assets may initiate a corresponding operation resulting in image data relating to a resultant instance of the user interface.

In some implementations where the captured image data includes image data of an application icon, the image features of the captured image data include one or more of a logo of an application, a design of an application icon, or the like. In some implementations where the captured image data include image data of a content item, the image features of the captured image data may include one or more of a design indicating a particular content item; an image of a character, person of interest or identifiable object in the content; a single frame of a scene of the content; and the like. For example, the content item may include a movie poster comprising an image of the main character of the movie, or may include album cover art for music content comprising an image of the music artist.

In some implementations, processing the captured image data to identify the above-described image features of the captured image data includes comparing the captured image data with stored image data on a database accessed by the one or more servers. Comparing the captured image data with stored image data may include identifying image features in the captured image data which have a level of similarity with image features in the stored image data which is above a predetermined threshold level of similarity. In some examples, identifying image features which have a level of similarity above a predetermined threshold level of similarity includes using image processing techniques for comparing images. In some implementations, a machine learning approach may identify images using key features of the image data and may ignore more specific features of the image data. For example, a machine learning approach may identify a change of language in text included in the captured image data, while recognising that the cover art of the captured image data is unchanged, compared with the stored image data. Further, Perceptual Hashing (Phash) may also be used to carry out such a comparison, or any other suitable image comparison techniques.

In some implementations, comparing the captured image data with stored image data involves the use of artificial intelligence to identify image features of a digital asset based on variations of the image features of the digital assets. For example, machine learning may be used to employ a trained engine that has a library of known images. The trained engine may compare the captured image data with the library of known images in search of matches and may return a confidence number or score. The confidence number or score may indicate the level of match determined by the trained engine between the captured image data and a known image. Alternatively or additionally, the trained engine may have the ability to detect unknown images. The trained engine may carry out the matching process by determining a confidence number of the "x" best matches. That is, the trained engine may determine the confidence number of the matches with the highest level of matching and return a list of these known images. If one the confidence number of one of the matches is substantially larger than the confidence number of the other matches then it may be marked as an automatch. If none of the confidence numbers of any of the matches is substantially larger than the confidence numbers of the other matches then the captured image data may be sent to an allocations team of human operators to carry out a manual match process. The manual matches are then added into the machine learning library such that the machine learning continually improves.

In some implementations, the captured image data is processed to identify a brand of a distributor in the captured image data. For example, the captured image data may be processed to identify Netflix®, Prime®, HBO®, Discovery® or any other suitable distributor brand.

In some implementations, the captured image data also include image data of a navigation icon. In these examples, the image features of the captured image data also include one or more of a symbol indicating a navigation option of a navigation menu, or the like. For example, a symbol may include a leftward facing arrow or a "return key" type symbol which may indicate that the selection of the menu option will return the user interface to an instance of the user interface which is one level higher or "back" than the current instance of the user interface.

Processing the captured image data to identify a parameter of an asset in the captured image data may further include using optical character recognition to identify text in the captured image data. Using optical character recognition improves the accuracy of image data matching by identifying specific characters in the image data which can then be compared with characters identified in a library of known images.

In some examples, text in the captured image data includes one or more of a title of the content to which the content item relates, a tag line or slogan associated with the content to which the content item relates, a date at which the content is scheduled to become available on the platform, price information regarding accessing the content, and the like.

In some implementations, the captured image data provided to the one or more servers via the communication network include an encoded timestamp of the time of capturing the image data. In this way, analysis of the image data includes analysing the contextual information of when the capture of the image data occurred. It may be possible to determine from this contextual information whether a digital asset has been released on a particular platform before a planned release date (abuse of rights) and then a user pirates the content before the release date, damaging the commercial value of the content (piracy). It may be possible to determine from this contextual information whether a digital asset is still being provided on a particular platform after a planned end date for inclusion of the digital asset on that platform (abuse of rights). In this way, content providers, service providers and content distributors may be more easily able to detect such piracy and/or abuse of rights issues and may be able to effect change relating to content or services being hosted on a particular platform contrary to an agreement in place.

In some implementations, the captured image data provided to the one or more servers via the communication network include the geographic location of the electronic device being scanned. In this way, analysis of the image data includes analysing the contextual information of the geographic location of the electronic device being scanned. It may be possible to determine from this contextual information whether a digital asset is being hosted on a platform in a location which is not included in a stored list of locations for the digital asset. In this way, content providers, service providers and content distributors may be more easily able to detect when digital assets are being offered in areas which do not have an agreement in place to offer such content or services. Content providers, service providers and content distributors may be able to effect change relating to content or services being hosted on a particular platform contrary to an agreement in place as a result.

Using a combination of geographic location information of the electronic device and timestamp information of when the image data was captured, it may be possible to determine when a digital asset is being displayed in a particular location (e.g. country, region, jurisdiction, or the like) before a planned release date in that location (piracy). It may be possible to determine when a digital asset is being displayed in a particular location (e.g. country, region, jurisdiction, or the like) before beyond a planned end date in that location (abuse of rights). In this way, content providers, service providers and content distributors can more easily detect locations in which piracy and/or abuse of rights issues are occurring regarding their content or service(s).

Figure 2:
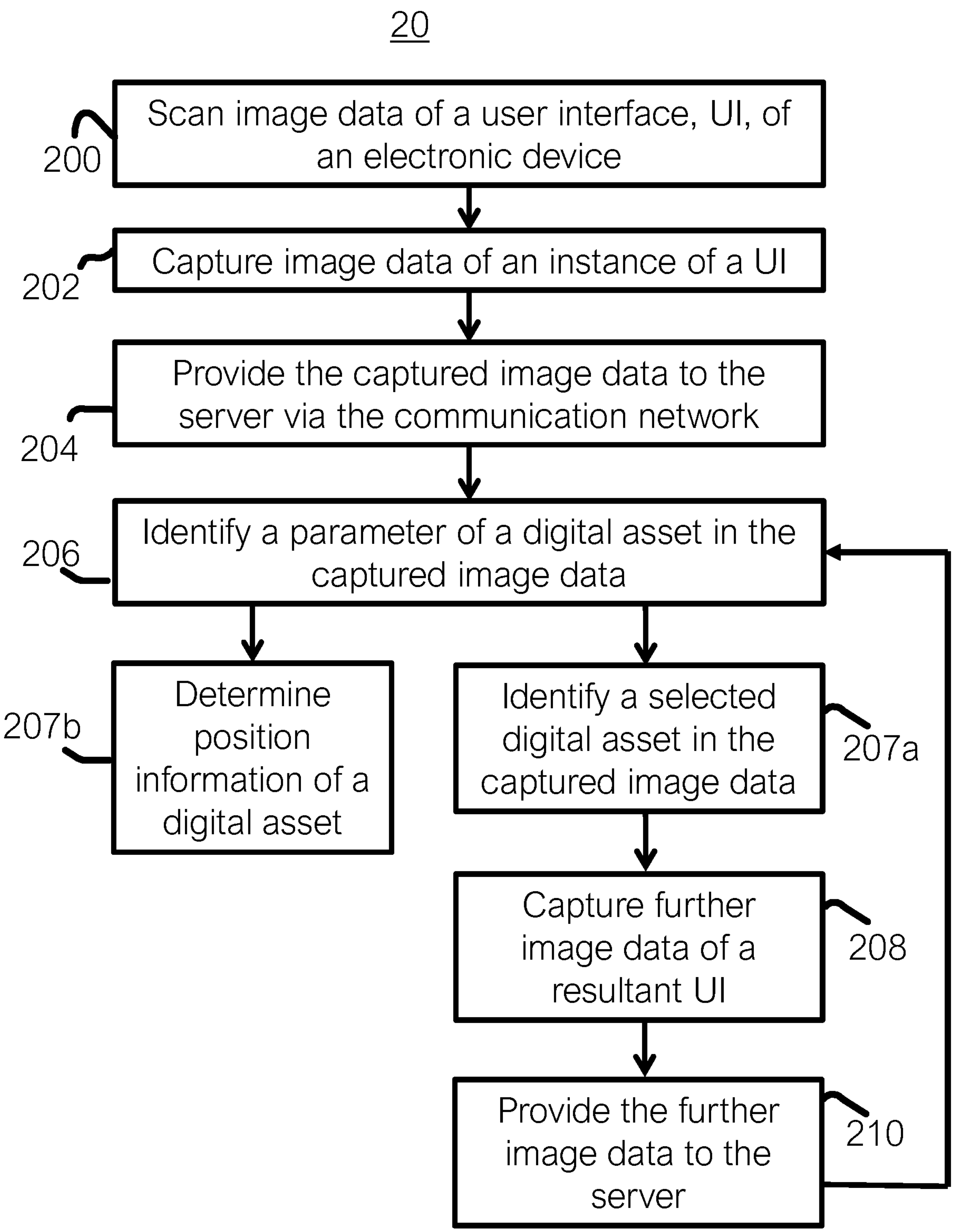
FIG. 2 is a flowchart showing a method of capturing and analysing image data of digital assets for display on an electronic device.

Referring to FIG. 2, a flowchart of a method 20 of capturing and analysing image data of a user interface for determining the placement of content items and application icons relating to digital assets by an electronic device is shown, according to some implementations.

Operations 200, 202, 204 and 206 are carried out in the same manner as corresponding operations 100, 102, 104 and 106 described above in relation to FIG. 1. Thus, detailed description of these operations will not be repeated.

Operation 206 may include analysing, by the one or more servers, the captured image data to identify, in operation 207*a*, a selected digital asset from among the one or more digital assets in the captured image data. That is, the captured image data may include an indication of an asset which is selected. In some examples, the captured image data may indicate a highlighting of an asset, a different colour of the asset compared with other assets in the captured image data, a border applied to the asset, or any other formatting to indicate the selection of the asset in the captured image data. The captured image data may be analysed such that features indicating the selection of an asset are identified and recorded in order to map an operation which occurs as a result of the selection of the asset.

In response to identifying, in operation 207*a*, a selected digital asset in the captured image data, the scanning device may be configured to capture, in operation 208, further image data of a resultant instance of the user interface of the electronic device. That is, the scanning device may capture further image data which results from a command to select a particular icon on the instance of the user interface. The capturing of the further image data is carried out in the same manner as described above in operation 102 in relation to FIG. 1. For example, the capturing of further image data also involves navigating through menu options and into content windows to get additional information of the user interfaces which result from selection of an menu option or content item title. Such navigation can reveal additional information which is contained within the user interface of the content window displayed as a result of selection of the content item. For example, pricing information of the content item may be revealed after selection of the content item.

By way of example, when an application icon or navigation icon is selected, this may result in further image data of another instance of the user interface. In some examples, where the selected icon is an application icon, selection of the icon may reveal more information about the placement of the digital assets within that application. For example, selection of a particular streaming service may reveal an array of titles which are arranged on the user interface in a particular way. The scanning device may capture further image data of the layout of the resultant instance of the user interface in response to the selection of the particular icon.

In operation 210, the further captured image data is provided to the one or more servers. At this point in the method, the further image data is analysed to identify another parameter of the one or more digital assets in the further captured image data in the same manner as described regarding the image data above.

As a result of analysing the further image data to identify another parameter of the one or more digital assets in the further captured image data, a resultant instance of the user interface which occurs in response to the selection of a particular icon on the instance of the user interface. This enables a provider of the application, to which the selected application icon relates, to understand more about the placement of content items within the application on a particular electronic device or platform on an electronic device.

Alternatively or additionally, in some implementations, operation 206 includes analysing, by the one or more servers, the captured image data to determine, in operation 207*b*, position information of one or more digital assets in the captured image data. In some implementations, the one or more servers may inspect the captured image data to determine one or more of a page, a row, a column, and a spot in the image data where one or more digital assets are located in the image to be displayed. In some examples, the position information may include coordinates indicating the location on a display screen where a digital asset is to be displayed. The coordinates may indicate the location of the centre of the asset, location of an edge defining the perimeter of the asset, the dimensions of the asset, the shape of the asset, and the like.

The captured image data including the position information of one or more digital assets in the captured image data can be combined with user data to understand the value of the placement of the one or more digital assets.

That is, the one or more servers may obtain user data from a third party service, for example a streaming service or the like (not shown). The user data may indicate the actions of users in relation to certain digital assets for the third party service. For example, the user data may include sales data from a streaming service indicating how an item of content performed with users of the streaming service.

The user data is combined, for a particular service, with the position information of digital assets in the captured image data to determine a correlation between the position of digital assets and their performance with users. A value curve may be generated to combine the user data and the position information and indicate the most valuable spots on the storefront for a particular service. That is, at the one or more servers, any user interface may be divided into a grid and the value curve may then be applied to the grid to build a model to demonstrate the relative value of different areas on the user interface. The model may be built by assigning a weighting value according to the value curve, for each spot placement on the user interface.

This facilitates the determination and indication of the areas on the storefront which attract the most user attention, are selected most often, result in best performance of the content, and the like. As the system obtains more user data and positional information of digital assets, the model may be refined.

Other factors, in addition to user data, may be inserted into the model. For example, the size of the market for the content in a particular geographical location may be pertinent information which can be factored into the model to ensure that the model reflects an accurate value curve for the content in the each location.

Figure 3:
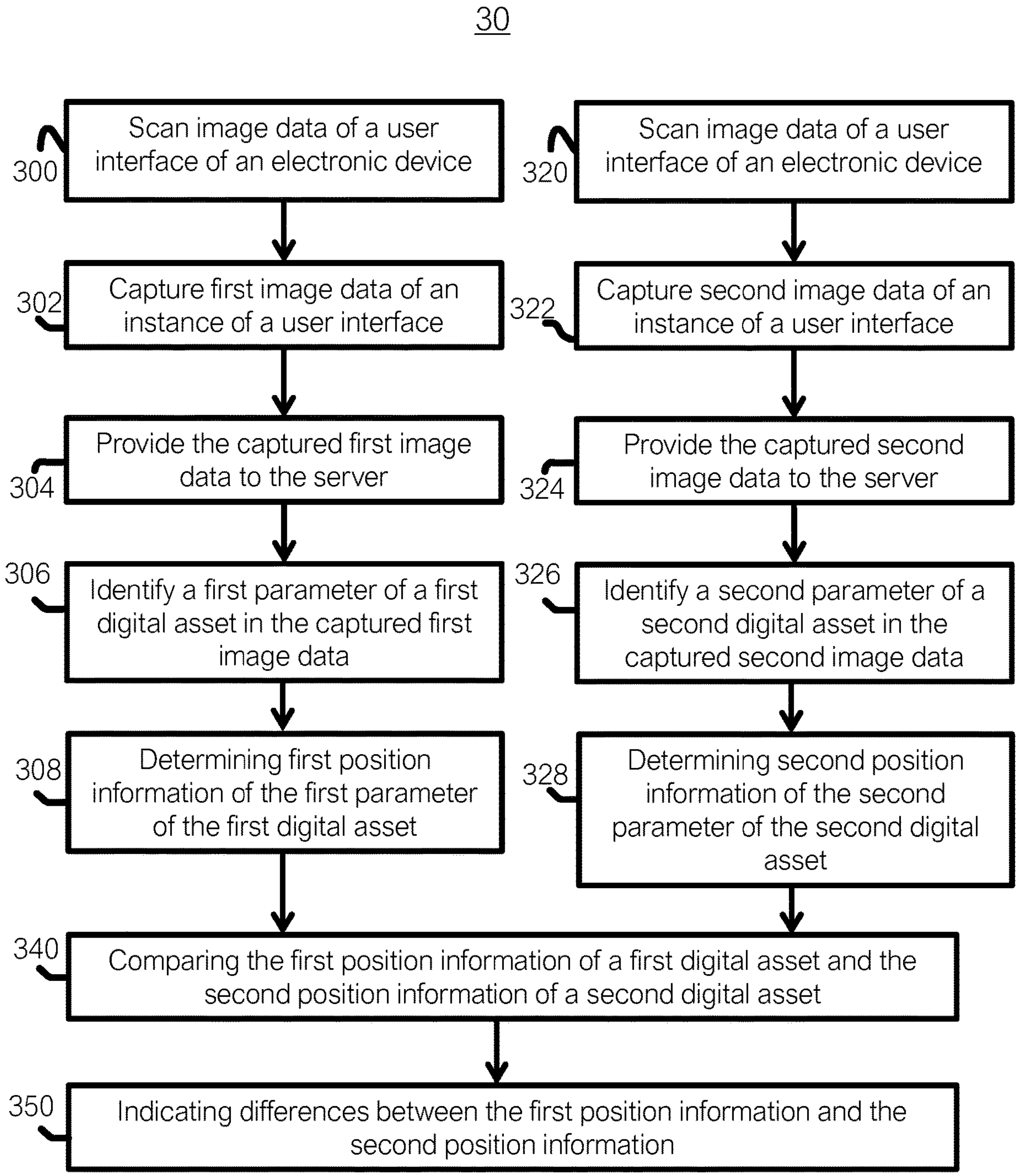
FIG. 3 is a flowchart showing a method of capturing and analysing image data for display on two different electronic devices and comparing the image data.

Referring to FIG. 3, a flowchart of a method 30 of capturing and analysing image data for display on two different electronic devices and comparing the image data is shown, according to some implementations. The method 30 may be carried out by a first scanning device and a second scanning device. The first and the second scanning devices may be different physical devices or the first and second scanning devices may be the same physical device at different times.

Operations 300, 302, 304 and 306 correspond, for a first scanning device, with operations 320, 322, 324, 326, for a second scanning device. The operations are carried out in the same manner as corresponding operations 100, 102, 104 and 106 described above in relation to FIG. 1 and corresponding operations 200, 202, 204 and 206 described above in relation to FIG. 2. Thus, to the extent that such corresponding operations in relation to FIG. 3 are carried out in the same way as those of FIGS. 1 and 2, a detailed description of these operations will not be repeated.

A scanning device carrying out operations 300, 302 and 304 will be referred to as a first scanning device and a scanning device carrying out operations 320, 322 and 324 will be referred to as a second scanning device in what follows for ease of reference.

In some implementations, the first scanning device and the second scanning device are different physical devices.

In such examples in relation to FIG. 3, in operation 302, a first scanning device captures first image data for display by a first electronic device. The captured first image data may be encoded with a first timestamp indicating the time of capturing the first image data by the first scanning device. The captured first image data may be encoded with a first geographic location indicating the location of a first electronic device. The captured first image data may be encoded with one of a first timestamp or a first geographic location, or may be encoded with both a first timestamp and a first geographic location.

Further, in operation 322, a second scanning device (which is a different physical device to the first scanning device) captures second image data for display by a second electronic device. The captured second image data may be encoded with a second timestamp indicating the time of capturing the second image data. The captured second image data may be encoded with a second geographic location indicating the location of the second electronic device. The captured second image data may be encoded with one of a second timestamp or a second geographic location, or may be encoded with both a second timestamp and a second geographic location.

In some examples, the second timestamp indicates a time which is later than the time indicated by the first timestamp.

In operation 304, the captured first image data is provided to the one or more servers by the first scanning device.

In operation 324, the captured second image data is provided to the one or more servers by the second scanning device.

In operation 306, the one or more servers identify a first parameter of a first digital asset in the captured first image data.

In operation 326, the one or more servers identify a second parameter of a second digital asset in the captured second image data.

In operation 308, the one or more servers determine first position information of the first digital asset in the captured first image data.

In operation 328, the one or more servers determine second position information of the second digital asset in the captured second image data.

In operation 340, the method 30 continues by comparing, by the one or more servers, the first position information of the first digital asset in the captured image data with the second position information of the second digital asset in the captured second image data.

In operation 350, the method 30 continues by indicating, by the one or more servers, differences identified between the first position information and the second position information.

In other implementations, the first scanning device and the second scanning device are the same physical device which carrying out the operations 300, 302 and 304 at a first time and carry out the operations 320, 322, 324 at a second time different from the first time. This is described above regarding encoding the image data captured in operation 102 with a timestamp indicating the time of capturing the image data.

In such examples in relation to FIG. 3, first image data is captured by the first scanning device in operation 302. The captured first image data is encoded with a first timestamp indicating the time of capturing the first image data by the first scanning device.

Further, second image data is captured by the second scanning device (which is the same physical device as the first scanning device) in operation 322. The captured second image data is encoded with a second timestamp indicating the time of capturing the second image data.

The second timestamp may indicate a time which is later than the time indicated by the first timestamp, but is not limited as such.

In operation 304, the captured first image data encoded with the first timestamp is provided to the one or more servers.

In operation 324, the captured second image data encoded with the second timestamp is provided to the one or more servers.

In operation 306, the one or more servers identify a parameter of one or more digital assets in the captured first image data. That is, once the one or more servers have received the captured first image data from the first scanning device, the one or more servers may process the captured first image data to perform an identification of a parameter of a digital asset in the captured first image data.

In operation 326, the one or more servers identify a second parameter of one or more second digital assets in the captured second image data. That is, once the one or more servers have received the captured second image data from the second scanning device, the one or more servers may process the captured second image data to perform an identification of a second parameter of a second digital asset in the captured second image data.

In operation 308, the one or more servers determine position information of the parameter in the captured image data. The position information may indicate the relative or absolute position of features in the captured image data. That is, the position information may relate to the spot at which a parameter of the digital asset is being shown on the display or may relate to the location of a key feature within the space occupied by the digital asset. In this way, the position information may indicate the position of the digital asset on the storefront or may indicate the important features of the appearance of the digital asset as displayed on a particular storefront.

In operation 328, the one or more servers determine second position information of the second parameter in the captured second image data. The second position information may indicate the relative or absolute position of features in the captured second image data. That is, the second position information may relate to the spot at which the second parameter of the second digital asset is being shown on the display or may relate to the location of a key feature within the space occupied by the second digital asset. In this way, the second position information may indicate the position of the second digital asset on the storefront or may indicate the important features of the appearance of the second digital asset as displayed on a particular storefront.

In operation 340, the first position information of a first digital asset and the second position information of a second digital asset are compared. The comparison may reveal differences between the first position information of a first digital asset and the second position information of a second digital asset.

If the first digital asset and the second digital asset pertain to the same content on different storefronts, e.g. as displayed on electronic devices made by different manufacturers, displayed on user interfaces of different content distributors, displayed on services intended for display in different geographic locations/jurisdictions, then the comparison may provide information regarding how the displays differ.

Alternatively, if the first digital asset and the second digital asset pertain to different content on different storefronts, then the comparison may reveal that the placement of some content is being provided at a position which is more favourable. That is, for example, the comparison may reveal that a first digital asset relating to first content is displayed in a more favourable position or location than a second digital asset relating to second content.

In operation 350, the revealed differences from the comparison between the first position information of a first parameter of a first digital asset and the second position information of a second parameter of a second digital asset is indicated via a report. The report may be sent to a human user for manual review or may be issued to a content/service provider, content/service distributor or content/service owner in response to a request for information regarding the placement of digital assets.

As above in relation to FIG. 2, the position information can be combined with user data to build a value curve. In this way, a grid of a user interface can be generated to model the relative value of different positions on the user interface. Description of this feature will not be repeated for FIG. 3, as it operates in the same way as that described above for FIG. 2.

Figure 4:
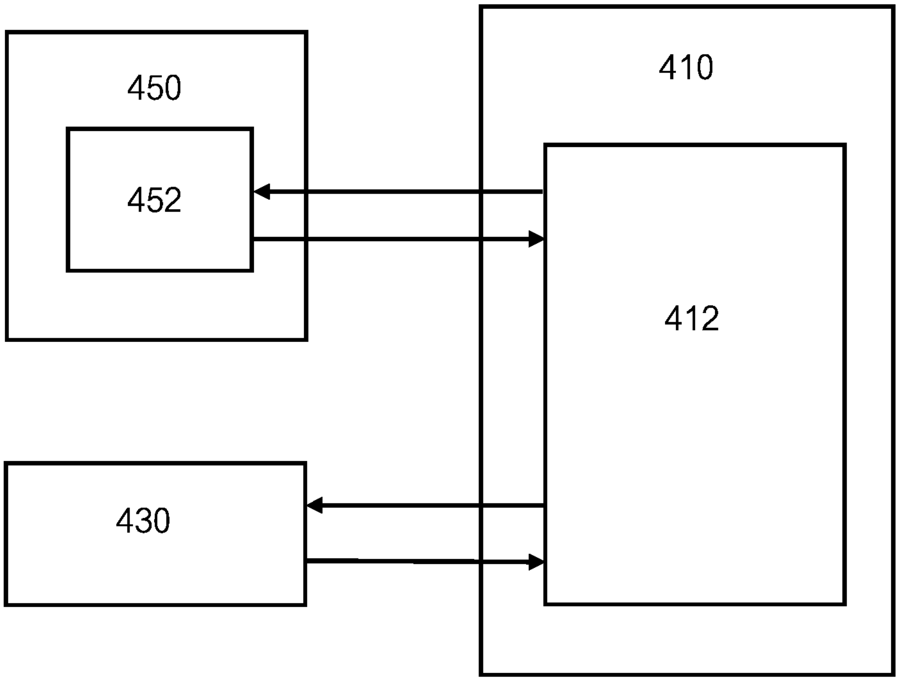
FIG. 4 shows a system for analysing the placement of digital assets on an electronic device.

FIG. 4 shows a diagram of hardware involved in the present disclosure.

FIG. 4 shows a system 400. The system analysing the placement of digital assets on an electronic device 430.

The system 400 includes one or more processors. In some examples, a first processor and a second processor are provided. The first processor and the second processor may be located on a scanning device. Alternatively, the first processor may be located on a scanning device and the second processor may be located at one or more servers in communication with the scanning device.

Referring to FIG. 4, the system 400 includes a scanning device 410. The scanning device includes a processor 412. In this example, the processor 412 carries out the scanning and capturing operations of the method described above in accordance with FIGS. 1 to 3. As these operations have been described above, detailed description of the operations will only be repeated insofar as it is necessary for describing the hardware features involved in each operation.

The scanning device 410 is in communication with an electronic device 430 and a server 450.

The electronic device 430 may be a set-top box (STB), television, smart television, mobile device, a computing device, a tablet computing device, or the like. The electronic device 430 may be any device which provides a user with access to content via an application or service distributed by a content distributor.

The scanning device 410 is in communication with the electronic device 430 for input from the scanning device 410 into the electronic device 430. For input communication from the scanning device 410 to the electronic device 430, modes of communication may include Bluetooth®, Infrared technology (IR), a USB connection, or the like.

The scanning device 410 is also in communication with the electronic device 430 for output from the electronic device 430 to the scanning device 410. For capturing output from the electronic device 430, modes of communication may include HDMI, or the like.

The scanning device 410 may be provided physically next to the electronic device 430 such that the geographic location of the electronic device 430 is known to the deployer of the scanning device 410.

In the scanning operation as described in operation 100 above, the processor 412 of the scanning device 410 scans the electronic device 430.

Once the processor 412 has captured the image data in the capturing operation, the processor 412 then provides the captured image data to the server 450.

In the example shown in FIG. 4, the server 450 includes a second processor 452. The second processor 452 receives the captured image data from the scanning device 410 and analyses the captured image data. That is, in this example, the second processor 452 carries out the receiving and analysing operations of the method described above in accordance with FIGS. 1 to 3. As these operations have been described above, detailed description of the operations will only be repeated insofar as it is necessary for describing the hardware features involved in each operation.

Captured image data may be sent by the scanning device 410 to the server 450 to be stored at the server 450 in buckets. For example, the server 450 may store the captured image data in S3 buckets, or the like.

The second processor 452 of the server 450 processes the data according to the method set out above in operation 106 with reference to FIG. 1, set out above in operations 206, 207*a*/207*b* and 208 with reference to FIG. 2, and set out above in operations 306, 308, 326, 328, 340 and 350 of the description with reference to FIG. 3. The description of these operations of the server will not be reproduced here in order to avoid repetition.

The approaches and methods described herein may be embodied on a computer-readable medium, which may be a non-transitory computer-readable medium. The computer-readable medium carrying computer-readable instructions arranged for execution upon a processor so as to make the processor carry out any or all of the methods described herein.

The term "computer-readable medium" as used herein refers to any medium that stores data and/or instructions for causing a processor to operate in a specific manner. Such storage medium may comprise non-volatile media and/or volatile media. Non-volatile media may include, for example, optical or magnetic disks. Volatile media may include dynamic memory. Exemplary forms of storage medium include, a floppy disk, a flexible disk, a hard disk, a solid-state drive, a magnetic tape, or any other magnetic data storage medium, a CD-ROM, any other optical data storage medium, any physical medium with one or more patterns of holes, a RAM, a PROM, an EPROM, a FLASH-EPROM, NVRAM, and any other memory chip or cartridge.

Storage may also be provided by means of a cloud storage system. For example, the storage may be shared over a network by multiple computing devices (e.g., a cloud storage device).

Figure 5:
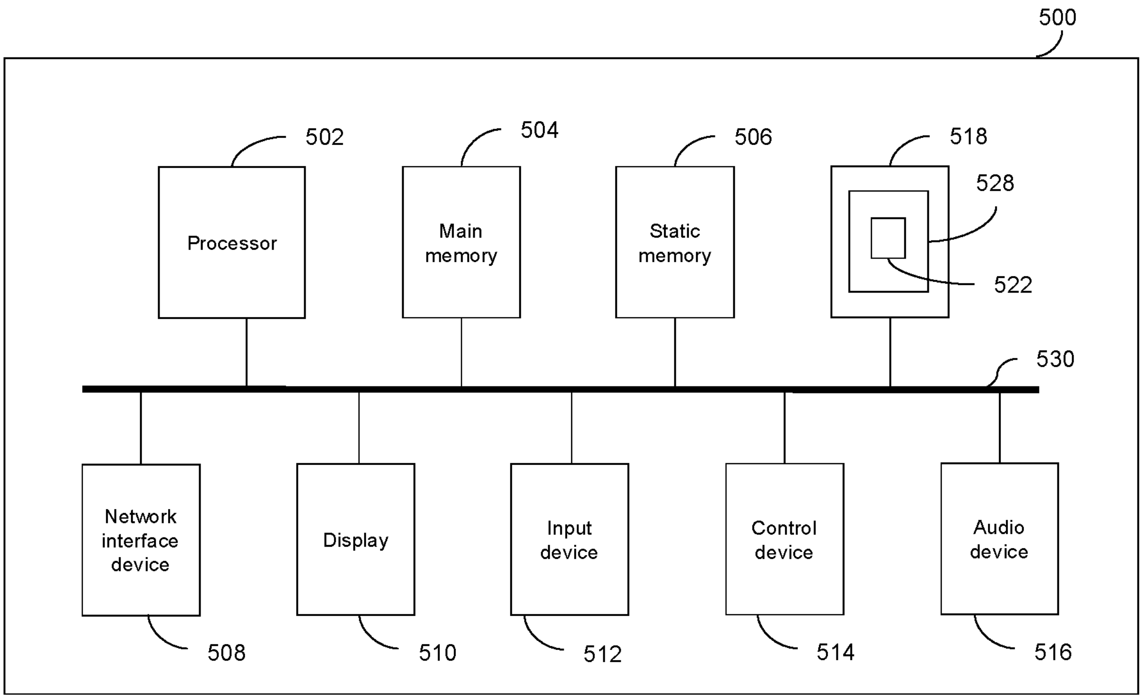
FIG. 5 illustrates a computing device or unit.

FIG. 5 illustrates a block diagram of one implementation of a computing device 500 within which a set of instructions, for causing the computing device to perform any one or more of the methodologies discussed herein, may be executed. In alternative implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 500 includes a processing device 502, a main memory 504 (e.g., read-only memory (ROM), flash memory, dynamic random-access memory (DRAM) such as synchronous DRAM (SDRAM) or Rambus DRAM (RDRAM), etc.), a static memory 506 (e.g., flash memory, static random-access memory (SRAM), etc.), and a secondary memory (e.g., a data storage device 518), which communicate with each other via a bus 530.

Processing device 502 represents one or more general-purpose processors such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the processing logic (instructions 522) for performing the operations, methods and steps discussed herein.

The computing device 500 may further include a network interface device 508. The computing device 500 also may include a video display unit 510 (e.g., a liquid crystal display (LCD) or a cathode ray tube (CRT)), an alphanumeric input device 512 (e.g., a keyboard or touchscreen), a cursor control device 514 (e.g., a mouse or touchscreen), and an audio device 516 (e.g., a speaker). The alphanumeric input device 512 and the cursor control device 514 may be considered together as a single input mechanism.

The data storage device 518 may include one or more machine-readable storage media (or more specifically one or more non-transitory computer-readable storage media) 528 on which is stored one or more sets of instructions 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid-state memory, magnetic tape, a removable computer diskette, a random-access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Machine learning techniques may be employed to optimise any of the parameters of the present disclosure—such as any of the threshold values—through the training of a computational neural network on example training data, for example. As such, a database of past operations may be provided, either locally or at a remote content management system. Once the parameters have been trained by machine learning techniques for a given type or genre of audio track, further active machine learning need not be applied.

Unless specifically stated otherwise, as apparent from the following discussion, it is appreciated that throughout the description, discussions utilizing terms such as "receiving", "determining", "comparing", "enabling", "maintaining", "identifying" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It will be understood that certain terminology is used in the preceding description for convenience and is not limiting. The terms "a", "an" and "the" should be read as meaning "at least one" unless otherwise specified. The term "comprising" will be understood to mean "including but not limited to" such that systems or method comprising a particular feature or step are not limited to only those features or steps listed but may also comprise features or steps not listed. Equally, terms such as "over", "under", "front", "back", "right", "left", "top", "bottom", "side", "clockwise", "anti-clockwise" and so on are used for convenience in interpreting the drawings and are not to be construed as limiting. Additionally, any method steps which are depicted in the figures as carried out sequentially, without causal connection, may alternatively be carried out in series in any order. Further, any method steps which are depicted as dashed or dotted flowchart boxes are to be understood as being optional.

The above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the scope of the appended claims. Accordingly, the specification and drawings are to be regarded in an illustrative sense rather than a restrictive sense.

The present disclosure also includes the following clause:

A1. A scanning device comprising:
- a. a processing system configured to:
  - i. scan image data of a user interface of an electronic device in communication with the scanning device;
  - ii. capture image data of an instance of the user interface of the electronic device;
  - iii. provide, via the communication network, the captured image data to one or more servers in communication with the scanning device.

The invention claimed is:

1. A method, carried out by one or more processors, for analyzing placement in a user interface, by an electronic device, of digital assets, the method comprising:

scanning image data of a user interface of an electronic device;

capturing image data of an instance of the user interface of the electronic device;

identifying a parameter of one or more digital assets in the captured image data, wherein identifying a parameter of one or more digital assets in the captured image data comprises analysing the captured image data to at least one of:

identifying a selected digital asset in the captured image data; or determining position information of one or more digital assets in the captured image data; or capturing image data comprises encoding the captured image data with a geographical location of the electronic device being scanned to capture the image data wherein the method further comprises, for a plurality of users:

obtaining, from a third party service, user data indicating performance data for user interactions with the digital asset on the third party service;

combining the user data for each of the plurality of users with the position information for the digital asset;

generating a value curve to indicate performance data is affected by the position of the digital asset on the user interface;

applying the value curve to the user interface to generate a model of the user interface indicating a relative value of positions on the user interface.

2. The method of claim 1, further comprising:

in response to identifying a selected digital asset in the captured image data, capturing further image data of a resultant instance of the user interface of the electronic device; and identifying another parameter of the one or more digital assets in the further captured image data.

3. The method of claim 1, further comprising:

in response to identifying a selected digital asset in the captured image data, determining position information of one or more digital assets in the captured image data.

4. The method of claim 2, wherein identifying another parameter of the one or more digital assets in the further captured image data comprises analysing the further captured image data to:

identify a further selected digital asset in the further captured image data; or determine position information of one or more digital assets in the further captured image data.

5. The method of claim 3, wherein the position information includes at least one of a page, a row, a column, or a spot at which the digital asset is disposed in the image data.

6. The method of claim 1, wherein the scanning and capturing are carried out by a first processor and the identifying is carried out by a second processor.

7. The method of claim 6, wherein the first processor and the second processor are located on a scanning device.

8. The method of claim 6, wherein the first processor is located on a scanning device and the second processor is located at one or more servers in communication with the scanning device via a communication network.

9. The method of claim 8, wherein the captured image data is provided, by the first processor on the scanning device, via the communication network, to the second processor on the one or more servers.

10. The method of claim 6, wherein identifying a parameter of the one or more digital assets in the captured image data further comprises:

in response to the captured image data being received at the second processor, processing the captured image data to identify text and/or image features of the one or more digital assets in the captured image data;

wherein processing the captured image data comprises using optical character recognition to identify text in the captured image data; and wherein the text includes a title of the digital asset.

11. The method of claim 9, further comprising:

comparing the identified text and/or image features of a digital asset in the captured image data with text and/or image features of one or more stored digital assets in a database at the one or more servers to identify said digital asset.

12. The method of claim 10, wherein image features comprise one or more of a logo of an application, a design of an application icon, a design indicating a particular content item, and a symbol indicating a particular navigation option of a user interface.

13. The method of claim 8, wherein the scanning device is deployed remotely from the electronic device.

14. The method of claim 11, wherein processing, by the one or more servers, the captured image data comprises using artificial intelligence to identify the image features of the one or more digital assets, wherein the artificial intelligence is configured to identify image features based on variations of said image features.

15. The method of claim 8, wherein the scanning device is a first scanning device, the electronic device is a first electronic device, the image data is first image data, the one or more digital assets are one or more first digital assets, and position information is first position information, the method further comprising:

capturing, by a second scanning device in communication with a second electronic device different to the first electronic device, second image data at the second electronic device;

providing, to the one or more servers via the communication network, the captured second image data;

identifying one or more second digital assets in the captured second image data; and for one or more second digital assets in the captured second image data:

determining second position information indicating the placement of an identified second digital asset in the captured second image data; and comparing the second position information indicating the placement of an identified second digital asset in the captured second image data with the first position information indicating the placement of the same identified digital asset among the one or more first digital assets in the captured first image data; and indicating differences in the position information indicating the placement of each identified digital asset.

16. The method of claim 1, wherein the one or more digital assets comprise an application icon or a content item of a user interface or wherein the one or more digital assets further comprise a navigation option of a user interface.

17. The method of claim 1, wherein the electronic device comprises a set-top box, a television, a smart television, a mobile device, a computing device or a tablet computing device or the image data comprises an image or an encoded signal or the method further comprises encoding the image data with a timestamp representing the time of capturing the image data.

18. The method of claim 17, further comprising:

determining that the image or the encoded signal is static before capturing the image data.

* * * * *